US010321049B2

(12) United States Patent
Ding

(10) Patent No.: US 10,321,049 B2
(45) Date of Patent: Jun. 11, 2019

(54) PHOTOGRAPHING CONTROL METHODS, PHOTOGRAPHING CONTROL APPARATUSES, AND PHOTOGRAPHING DEVICES

(71) Applicant: Beijing Zhigu Rui Tuo Tech Co., Ltd, Beijing (CN)

(72) Inventor: Dayong Ding, Beijing (CN)

(73) Assignee: Beijing Zhigu Rui Tuo Tech Co., Ltd, Beijing (CN)

( * ) Notice: Subject to any disclaimer, the term of this patent is extended or adjusted under 35 U.S.C. 154(b) by 0 days.

(21) Appl. No.: 15/321,677

(22) PCT Filed: Jun. 5, 2015

(86) PCT No.: PCT/CN2015/080841
§ 371 (c)(1),
(2) Date: Dec. 22, 2016

(87) PCT Pub. No.: WO2015/196917
PCT Pub. Date: Dec. 30, 2015

(65) Prior Publication Data
US 2017/0161914 A1 Jun. 8, 2017

(30) Foreign Application Priority Data
Jun. 27, 2014 (CN) .......................... 2014 1 0301247

(51) Int. Cl.
*H04N 5/232* (2006.01)
*G06T 7/70* (2017.01)

(52) U.S. Cl.
CPC ........... *H04N 5/23219* (2013.01); *G06T 7/70* (2017.01); *H04N 5/232* (2013.01); *H04N 5/23222* (2013.01); *H04N 5/23293* (2013.01)

(58) Field of Classification Search
CPC ........... H04N 5/23219; H04N 5/23222; H04N 5/23293; G06T 7/70
See application file for complete search history.

(56) References Cited

U.S. PATENT DOCUMENTS

| 5,625,848 A | 4/1997 | Imanari |
| 6,473,123 B1 * | 10/2002 | Anderson ............... G06T 3/606 348/230.1 |

(Continued)

FOREIGN PATENT DOCUMENTS

| CN | 103548337 A | 1/2014 |
| CN | 104104870 A | 10/2014 |

OTHER PUBLICATIONS

International Search Report for PCT Application No. PCT/CN2015/080841, dated Sep. 7, 2015, 3 pages.

*Primary Examiner* — Twyler L Haskins
*Assistant Examiner* — Fayez Bhuiyan
(74) *Attorney, Agent, or Firm* — Amin, Turocy & Watson, LLP

(57) ABSTRACT

Photographing control methods, apparatuses, and devices are described. A method comprises: determining a first orientation of a photographing device and a second orientation corresponding to a scenario mode; and determining, in response to that the first orientation is different from the second orientation, an imaging mode of the photographing device according to the second orientation. In this regard, an appropriate imaging mode is determined according to a second orientation when a first orientation of a photographing device is different from the second orientation corresponding to a scenario mode, to separate orientating of the photographing device from imaging of an imaging module, and therefore a photographing effect is not affected while consideration is given to both device gripping stability and operational convenience.

27 Claims, 9 Drawing Sheets

(56) References Cited

U.S. PATENT DOCUMENTS

| | | | |
|---|---|---|---|
| 8,896,533 B2* | 11/2014 | Sonoda | G06F 3/0346 345/158 |
| 9,363,466 B2 | 6/2016 | Takahashi et al. | |
| 2005/0143124 A1 | 6/2005 | Kennedy et al. | |
| 2011/0128410 A1 | 6/2011 | Lee et al. | |
| 2013/0258129 A1 | 10/2013 | Burns | |
| 2014/0022415 A1 | 1/2014 | Kitaya et al. | |

* cited by examiner

PHOTOGRAPHING CONTROL METHODS, PHOTOGRAPHING CONTROL APPARATUSES, AND PHOTOGRAPHING DEVICES

RELATED APPLICATION

The present application is a U.S. National Stage filing under 35 U.S.C. § 371 of international patent cooperation treaty (PCT) application No. PCT/CN2015/080841, filed Jun. 5, 2015, and entitled "PHOTOGRAPHING CONTROL METHODS, PHOTOGRAPHING CONTROL APPARATUSES, AND PHOTOGRAPHING DEVICES", which claims the benefit of priority to Chinese Patent Application No. 201410301247.7, filed on Jun. 27, 2014 which applications are hereby incorporated herein into the present application by reference in their respective entireties.

TECHNICAL FIELD

This application relates to the field of photographing technologies, and in particular, to photographing control methods, photographing control apparatuses, and photographing devices.

BACKGROUND

An imaging module (comprising an optical system (lens), a photosensitive element, and corresponding connecting circuits) is widely configured in a handheld device today. During use of a handheld device, stability of device gripping and operational convenience are indicators for a good user experience. Generally, gripping a device with one hand has high stability, which can also make it easy for a user to operate with the other hand. However, during photographing by the handheld device, it is often implicated to horizontally hold the device to cause the imaging module to be held horizontally for picture composition desires. In this scenario, two hands can generally be used for stable gripping. However, in this case, it seems to be inconvenient to perform a further operation.

SUMMARY

An example, non-limiting objective of this application lies in providing a photographing solution.

In a first example aspect of this application, a photographing control method is provided, comprising:
  determining a first orientation of a photographing device and a second orientation corresponding to a scenario mode; and
  determining, in response to that the first orientation is different from the second orientation, an imaging mode of the photographing device according to the second orientation, wherein
  the first orientation and the second orientation use a benchmark orientation as a reference.

In a second aspect of this application, an example embodiment of a photographing control apparatus is provided, comprising:
  a first determining module, configured to determine a first orientation of a photographing device and a second orientation corresponding to a scenario mode; and
  a second determining module, configured to determine, in response to that the first orientation is different from the second orientation, an imaging mode of the photographing device according to the second orientation, wherein
  the first orientation and the second orientation use a benchmark orientation as a reference.

In a third aspect of this application, an example embodiment of a photographing device is provided, which can comprise the photographing control apparatus of the second aspect of this application.

In a fourth aspect, an example embodiment of the present application provides a computer readable storage device, comprising at least one executable instruction, which, in response to execution, causes a system comprising a processor to perform operations, comprising:
  determining a first orientation of a photographing device and a second orientation corresponding to a scenario mode; and
  determining, in response to that the first orientation is different from the second orientation, an imaging mode of the photographing device according to the second orientation.

In a fifth aspect, an example embodiment of the present application provides a device for photographing control, comprising a processor and a memory, wherein the memory storing a computer executable instruction, the processor being connected with the memory via a communication bus, and when the device is operating, the processor executes or facilitates execution of the executable instructions stored by the memory to cause the device to perform operations, comprising:
  determining a first orientation of a photographing device and a second orientation corresponding to a scenario mode; and
  determining, in response to that the first orientation is different from the second orientation, an imaging mode of the photographing device according to the second orientation.

By using one or more of the methods, the apparatuses, and the devices of example embodiments of this application, an appropriate imaging mode is determined according to a second orientation when a first orientation of a photographing device is different from the second orientation corresponding to a scenario mode, to separate orientating of the photographing device from imaging of an imaging module, and therefore a photographing effect is not affected while consideration is given to both device gripping stability and operational convenience.

DETAILED DESCRIPTION

Figure 1:
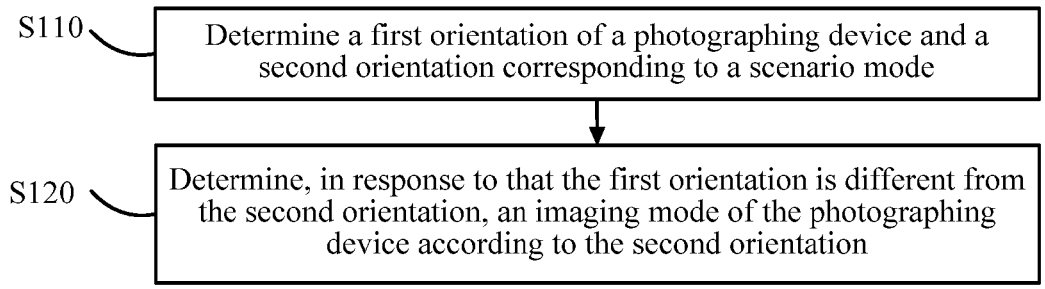
FIG. 1 is an example flowchart of a photographing control method according to an example embodiment of this application.

Example embodiments of this application are further described in detail below with reference to the accompanying drawings (in which like elements are denoted by like reference numerals). The following embodiments are intended to describe this application, but not to limit the scope of this application.

It can be understood by a person skilled in the art that the terms such as "first" and "second" in this application are only used to differentiate different steps, devices or modules, and the terms neither represent any specific technical meaning, nor represent an inevitable logic sequence between the steps, the devices, or the modules.

As shown in FIG. 1, a photographing control method according to an embodiment of this application comprises the following steps.

S110: Determine a first orientation of a photographing device and a second orientation corresponding to a scenario mode.

Figure 2A:
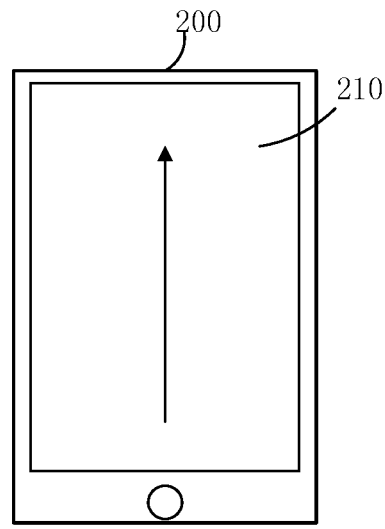
FIG. 2(a) and FIG. 2(b) are example schematic diagrams illustrating a benchmark orientation of one or more of the methods and apparatuses according to an example embodiment of this application.
Figure 2B:
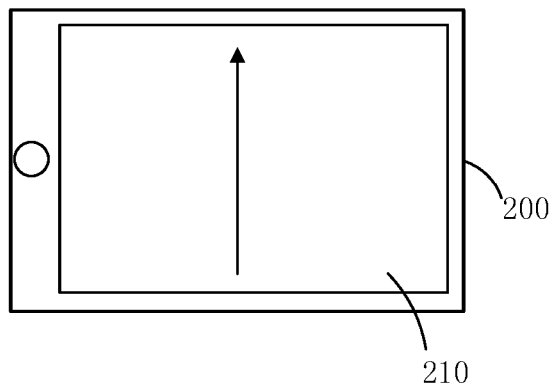
Figure 2C:
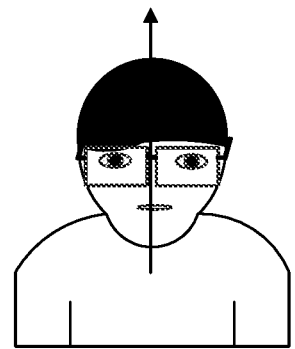
FIG. 2(c) is an example schematic diagram illustrating a benchmark orientation of one or more other methods and apparatuses according to an example embodiment of this application.

In the method of the embodiment of this application, the photographing device may refer to any handheld device having an imaging module, for example, a mobile phone, a tablet computer, or a digital camera. The first orientation and the second orientation are both directions by using one same benchmark orientation as a reference. The benchmark orientation may be an orientation of displayed content of the photographing device and represents a way of gripping the photographing device. The orientation of the displayed content may be obtained from the photographing device. As shown in FIG. 2(a) and FIG. 2(b), a photographing device 200 has a rectangular display screen (or viewfinder frame) 210. According to different ways of gripping a photographing device, the orientation of the displayed content, that is, the benchmark orientation, may be an extension direction of a longer (higher) edge of the display screen (or viewfinder frame) 210, as shown by an arrow in FIG. 2(a); or may be an extension direction of a longer (higher) edge that is perpendicular to the display screen (or viewfinder frame) 210, as shown by an arrow in FIG. 2(b). The benchmark orientation may also be an orientation of the head of a user, and as shown in FIG. 2(c), an extension direction of a middle axis of the head of a user is used as a benchmark orientation. In this case, the method of the embodiment of this application further comprises a step of detecting a posture of the head of a user to further determine a benchmark orientation.

The first orientation of the photographing device refers to the orientation of the display screen (or viewfinder frame) of the photographing device. In a state shown in FIG. 2(a), the first orientation is the same as the benchmark orientation. In a state shown in FIG. 2(b), the first orientation is perpendicular to the benchmark orientation.

The scenario mode of the photographing device comprises: a landscape mode and a portrait mode, where the second orientation corresponding to the landscape mode is an orientation that causes the length of a photographed image of the photographing device in the horizontal direction to be greater than the length of the photographed image of the photographing device in the vertical direction in the mode by using the benchmark orientation as a reference; and the second orientation corresponding to the portrait mode is an orientation that causes the length of a photographed image of the photographing device in the horizontal direction to be less than the length of the photographed image of the photographing device in the vertical direction in the mode by using the benchmark orientation as a reference. Different scenario modes represent different photographing intentions of the user and the second orientations corresponding to the scenario modes are also different in different gripping scenarios of the photographing device. Specifically, in the scenario shown in FIG. 2(a), the second orientation corresponding to the portrait mode is shown by a dashed-line box in FIG. 2(d), and the second orientation corresponding to the landscape mode is shown by a dashed-line box in FIG. 2(e). In the scenario shown in FIG. 2(b), the second orientation corresponding to the portrait mode is shown by a dashed-line box in FIG. 2(f), and the second orientation corresponding to the landscape mode is shown by a dashed-line box in FIG. 2(g).

S120: Determine, in response to that the first orientation is different from the second orientation, an imaging mode of the photographing device according to the second orientation.

Figure 2D:
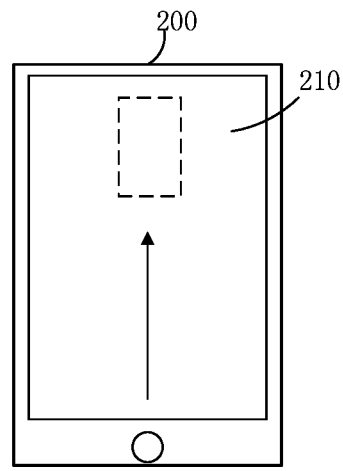
FIG. 2(d) and FIG. 2(e) are example separate schematic diagrams illustrating second orientations corresponding to a portrait mode and a landscape mode in the example scenario shown in FIG. 2(a)
Figure 2E:
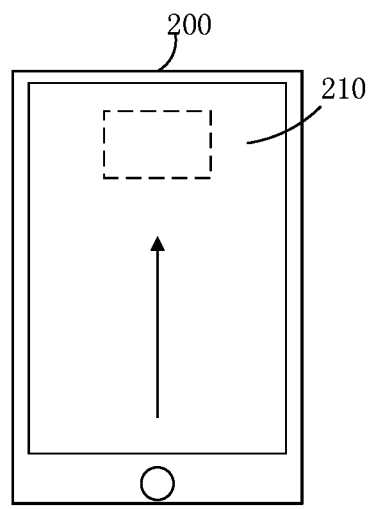
Figure 2F:
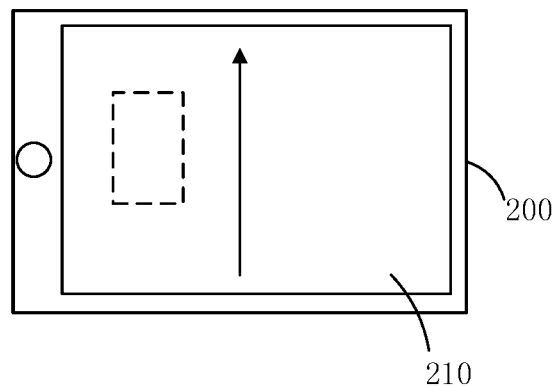
FIG. 2(f) and FIG. 2(g) are example separate schematic diagrams illustrating second orientations corresponding to a portrait mode and a landscape mode in the example scenario shown in FIG. 2(b)
Figure 2G:
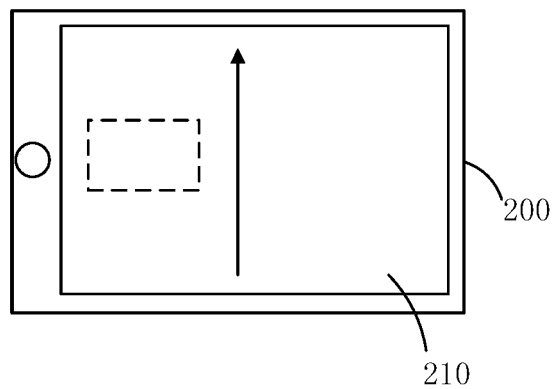

With respect to different ways of gripping a photographing device by a user, the second orientations corresponding to different scenario modes may differ from the first orientation. For example, when a desired scenario mode of the photographing device gripped by a user with one hand is the portrait mode, as shown in FIG. 2(d), the first orientation and the second orientation are both the same as the benchmark orientation, and when photographing is performed in this orientation, a desired photographing effect can be achieved while consideration is given to both gripping stability and operational convenience. When a desired scenario mode, as shown in FIG. 2(e), is the landscape mode, the second orientation is different from the first orientation, and as shown in FIG. 2(g), the first orientation (solid-line rectangular box) rotates by 90° ("α" in FIG. 2(g)) relative to the second orientation (dashed-line rectangular box).

A scenario mode reflects a photographing intention of a user. Therefore, in the method of the embodiment of this application, when the first orientation is different from the second orientation, the imaging mode of the imaging module of the photographing device is determined according to the second orientation by using the photographing intention of the user as a photographing factor considered first, so as to achieve a desired photographing effect when the user grips and operates the photographing device in a most comfortable way, and in particular, when the orientation of the photographing device is different from the orientation corresponding to the scenario mode.

To sum up, by using the method of the embodiment of this application, an appropriate imaging mode is determined according to a second orientation when a first orientation of a photographing device is different from the second orientation corresponding to a scenario mode, to separate orientating of the photographing device from imaging of an imaging module, and therefore a photographing effect is not affected while consideration is given to both device gripping stability and operational convenience.

In one example embodiment, the determining an imaging mode of the photographing device according to the second orientation in step S120 comprises:
  determining an imaging area that is on a photosensitive element of the photographing device and is corresponding to the second orientation.

Figure 3A:
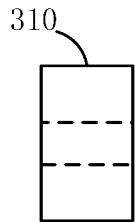
FIG. 3(a) to FIG. 3(d) are example schematic diagrams illustrating a relative relationship between a photosensitive element and a photosensitive area in one or more of the methods and apparatuses according to example embodiments of this application.
Figure 3B:
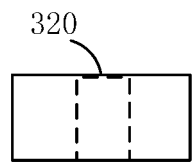
Figure 3C:
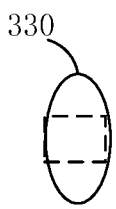
Figure 3D:
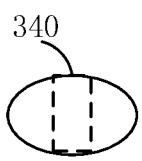

A photosensitive element (also referred to as an image sensor, for example, a charge coupled device (CCD) or a complementary metal-oxide semiconductor (CMOS)) is the core of an imaging module of a photographing device, and is configured to convert light rays into charges during receiving of light ray irradiation. After all or some of charges on the photosensitive element are processed, a photographed image is formed. All or some of areas of the photosensitive element configured to form an image are referred to as photosensitive areas in the method of the embodiment of this application. Photosensitive elements have different shapes and types. For example, a photosensitive element of a usual digital camera is of a shape of rectangle with a length-width ratio of 3:2. To achieve the objective of the method of the embodiment of this application, an appropriate imaging area can be determined according to the second orientation with respect to the photosensitive elements of different shapes. Specifically, the imaging area corresponding to the landscape mode is an area having the length in the horizontal direction being greater than the length in the vertical direction. The imaging area corresponding to the portrait mode is an area having the length in the horizontal direction being less than the length in the vertical direction. In determining of an imaging area, sufficient consideration should be given to the shape of the photosensitive element: in a landscape mode, for a rectangular photosensitive element with a length-width ratio being greater than 1, as shown in FIG. 3(a), a rectangular photosensitive area (shown by the dashed-line box) with a length-width ratio being less than 1 implicated by the landscape mode in a photosensitive element 310 should be determined; in a portrait mode, for a rectangular photosensitive element with a length-width ratio being less than 1, as shown in FIG. 3(b), a rectangular photosensitive area (shown by the dashed-line box) with a length-width ratio being greater than 1 implicated by the portrait mode in a photosensitive element 320 should be determined. The photosensitive element may also be of other shapes apart from the rectangle. Correspondingly, the imaging area with a length-width ratio implicated by the second orientation should be determined in the photosensitive element. FIG. 3(c) and FIG. 3(d) show scenarios of oval photosensitive elements 330 and 340 and corresponding photosensitive areas.

In another example embodiment, the determining an imaging mode of the photographing device according to the second orientation in step S120 may further comprise:
  determining a third orientation that is of an imaging module of the photographing device and is corresponding to the second orientation.

In the method of the embodiment of this application, in response to that the imaging module of the photographing device is adjustable relative to the main body of the photographing device, a third orientation of the imaging module may be determined according to the second orientation. Specifically, for a rectangular photosensitive element, when the first orientation is different from the second orientation, the third orientation of the imaging module is adjusted, to cause the adjusted third orientation to be the same as the second orientation. For a non-rectangular photosensitive element, adjustment should be performed in such a manner that the imaging area determined on the adjusted photosensitive element is capable of using the photosensitive element to a maximum limit.

Besides, step S110 may comprise:
  S111: Determine a first orientation of the photographing device.

In one example embodiment, the first orientation may be determined by using a sensor of the photographing device, for example, a gravity sensor.

S112: Determine the scenario mode.

In one example embodiment, the scenario mode may be determined according to a user input. The user input may be an input in a form of an audio, a touch, a gesture, or the like.

After the imaging mode is determined, the method of the embodiment of this application may further comprise:
  S130: Execute photographing according to the imaging mode.

Specifically, in the example embodiment of determining an imaging area that is on the photosensitive element of the photographing device and is corresponding to the second orientation, in step S130, an optical system of the photographing device may be adjusted according to the imaging area, to cause only the determined imaging area to be capable of receiving light rays. In the example embodiment of determining an imaging mode by determining the third orientation that is of the imaging module of the photographing device and is corresponding to the second orientation, in step S130, the orientation of the imaging module may be adjusted directly or indirectly according to the third orientation.

To sum up, the method of the embodiment of this application is capable of giving consideration to stability of gripping a photographing device, operational convenience, and a photographing effect at the same time.

It can be understood by a person skilled in the art that in the foregoing method of the example embodiment of this application, the value of the serial number of each step does not mean an execution sequence, and the execution sequence of each step should be determined according to the function and internal logic thereof, and should not be any limitation on the example embodiments of this application.

Besides, an embodiment of this application further provides a computer-readable medium, comprising computer-readable instructions that perform the following operations upon execution: operations of executing steps S1, S2, and S3 of the method in the example embodiment shown in FIG. 1.

Figure 4:
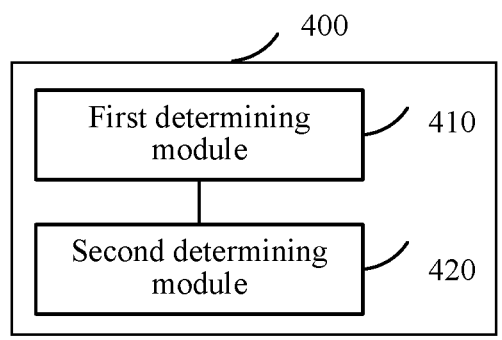
FIG. 4 is an example structural block diagram of a photographing control apparatus according to an example embodiment of this application.

An embodiment of this application further provides a photographing control apparatus for executing the photographing control method. The photographing control apparatus may be an apparatus that is independent from the photographing device or is part of the photographing device. As shown in FIG. 4, a photographing control apparatus 400 of an embodiment of this application comprises a first determining module 410 and a second determining module 420.

The first determining module 410 is configured to determine a first orientation of a photographing device and a second orientation corresponding to a scenario mode.

In the apparatus of the embodiment of this application, the first orientation and the second orientation are both directions by using one same benchmark orientation as a reference. The benchmark orientation may be an orientation of displayed content of the photographing device and represents a way of gripping a photographing device. The benchmark orientation may be obtained from the photographing device. As shown in FIG. 2(a) and FIG. 2(b), a photographing device 200 has a rectangular display screen (or viewfinder frame) 210. According to different ways of gripping a photographing device, the orientation of the displayed content, that is, the benchmark orientation, may be an extension direction of a longer (higher) edge of the display screen (or viewfinder frame) 210, as shown by an arrow in FIG. 2(a); or may be an extension direction of a longer (higher) edge that is perpendicular to the display screen (or viewfinder frame) 210, as shown by an arrow in FIG. 2(b). The benchmark orientation may also be an orientation of the head of a user, and as shown in FIG. 2(c), an extension direction of a middle axis of the head of a user is used as a benchmark orientation.

The first orientation of the photographing device refers to the orientation of the display screen (or viewfinder frame) of the photographing device. In a state shown in FIG. 2(a), the first orientation is the same as the benchmark orientation. In a state shown in FIG. 2(b), the first orientation is perpendicular to the benchmark orientation.

The scenario mode of the photographing device comprises: a landscape mode and a portrait mode, where the second orientation corresponding to the landscape mode is an orientation that causes the length of a photographed image of the photographing device in the horizontal direction to be greater than the length of the photographed image of the photographing device in the vertical direction in the mode by using the benchmark orientation as a reference; and the second orientation corresponding to the portrait mode is an orientation that causes the length of a photographed image of the photographing device in the horizontal direction to be less than the length of the photographed image of the photographing device in the vertical direction in the mode by using the benchmark orientation as a reference. Different scenario modes represent different photographing intentions of the user and the second orientations corresponding to the scenario modes are also different in different gripping scenarios of the photographing device. Specifically, in the scenario shown in FIG. 2(a), the second orientation corresponding to the portrait mode is shown by a dashed-line box in FIG. 2(d), and the second orientation corresponding to the landscape mode is shown by a dashed-line box in FIG. 2(e). In the scenario shown in FIG. 2(b), the second orientation corresponding to the portrait mode is shown by a dashed-line box in FIG. 2(f), and the second orientation corresponding to the landscape mode is shown by a dashed-line box in FIG. 2(g).

The second determining module 420 is configured to determine, in response to that the first orientation is different from the second orientation, an imaging mode of the photographing device according to the second orientation.

Figure 2H:
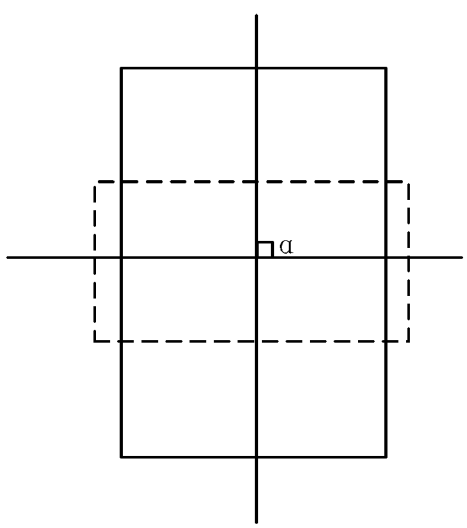
FIG. 2(h) is an example schematic diagram illustrating a relative relationship between a first orientation and a second orientation different from the first orientation of one or more methods and apparatuses according to example embodiments of this application.

With respect to different ways of gripping a photographing device by a user, the second orientations corresponding to different scenario modes may differ from the first orientation. For example, when a desired scenario mode of the photographing device gripped by a user with one hand is the portrait mode, as shown in FIG. 2(e), the first orientation and the second orientation are both the same as the benchmark orientation, and when photographing is performed in this orientation, a desired photographing effect can be achieved while consideration is given to both gripping stability and operational convenience. When a desired scenario mode, as shown in FIG. 2(f), is the landscape mode, the second orientation is different from the first orientation, and as shown in FIG. 2(h), the first orientation (solid-line rectangular box) rotates by 90° ("α" in FIG. 2(h)) relative to the second orientation (dashed-line rectangular box).

A scenario mode reflects a photographing intention of a user. Therefore, in the apparatus of the embodiment of this application, when the first orientation is different from the second orientation, the imaging mode of the imaging module of the photographing device is determined according to the second orientation by using the photographing intention of the user as a photographing factor considered first, so as to achieve a desired photographing effect when the user grips and operates the photographing device in a most comfortable way, and in particular, when the orientation of the photographing device is different from the orientation corresponding to the scenario mode.

To sum up, by using the apparatus of the embodiment of this application, an appropriate imaging mode is determined according to a second orientation when a first orientation of a photographing device is different from the second orientation corresponding to a scenario mode, to separate orientating of the photographing device from imaging of an imaging module, and therefore a photographing effect is not affected while consideration is given to both device gripping stability and operational convenience.

Figure 5:
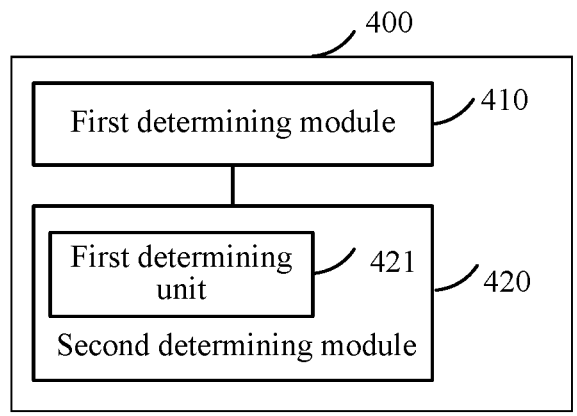
FIG. 5 is an example structural block diagram of one possible implementation of a photographing control apparatus according to an example embodiment of this application.

As shown in FIG. 5, in one example embodiment the second determining module 420 comprises:
  a first determining unit 421, configured to determine an imaging area that is on a photosensitive element of the photographing device and is corresponding to the second orientation.

To achieve the objective of the apparatus of the embodiment of this application, an appropriate imaging area can be determined according to the second orientation with respect to the photosensitive elements of different shapes. Specifically, the imaging area corresponding to the landscape mode is an area having the length in the horizontal direction being greater than the length in the vertical direction. The imaging area corresponding to the portrait mode is an area having the length in the horizontal direction being less than the length in the vertical direction. When the first determining unit 421 determines an imaging area, sufficient consideration should be given to the shape of the photosensitive element: in a landscape mode, for a rectangular photosensitive element with a length-width ratio being greater than 1, as shown in FIG. 3(a), the first determining unit 421 should determine a rectangular photosensitive area (shown by the dashed-line box) with a length-width ratio being less than 1 implicated by the landscape mode in a photosensitive element 310; in a portrait mode, for a rectangular photosensitive element with a length-width ratio being less than 1, as shown in FIG. 3(b), the first determining unit 421 should determine a rectangular photosensitive area (shown by the dashed-line box) with a length-width ratio being greater than 1 implicated by the portrait mode in a photosensitive element 320. The photosensitive element may also be of other shapes apart from the rectangle. Correspondingly, the first determining unit 421 should determine an imaging area with a length-width ratio implicated by the second orientation in the photosensitive element. FIG. 3(c) and FIG. 3(d) show scenarios of oval photosensitive elements 330 and 340 and corresponding photosensitive areas.

Figure 6:
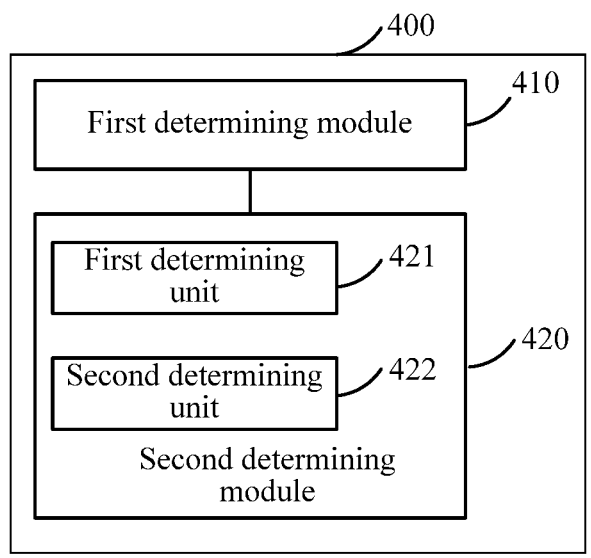
FIG. 6 is an example structural block diagram of a second possible implementation of a photographing control apparatus according to an example embodiment of this application.

As shown in FIG. 6, in another example embodiment, the second determining module 420 may comprise:

a second determining unit 422, configured to determine a third orientation that is of an imaging module of the photographing device and is corresponding to the second orientation.

In the apparatus of the embodiment of this application, the second determining module 420 may determine, in response to that the imaging module of the photographing device is adjustable relative to the main body of the photographing device, a third orientation of the imaging module according to the second orientation. Specifically, for a rectangular photosensitive element, when the first orientation is different from the second orientation, the third orientation of the imaging module should be adjusted, to cause the adjusted third orientation to be the same as the second orientation. For a non-rectangular photosensitive element, adjustment should be performed in such a manner that the imaging area determined on the adjusted photosensitive element is capable of using the photosensitive element to a maximum limit.

Figure 7:
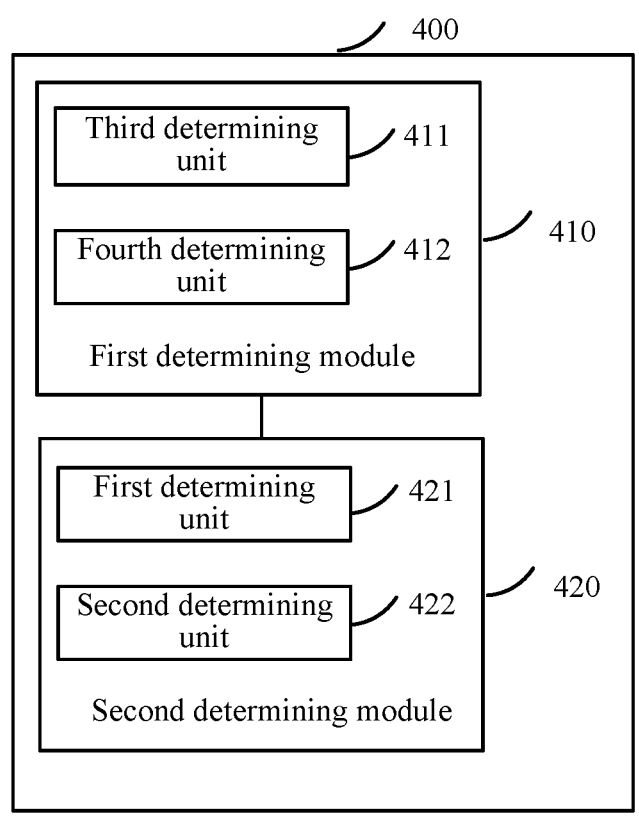
FIG. 7 is an example structural block diagram of a third possible implementation of a photographing control apparatus according to an example embodiment of this application.

In addition, as shown in FIG. 7, the first determining module 410 may comprise a third determining unit 411 and a fourth determining unit 412.

The third determining unit 411 is configured to determine a first orientation of a screen of the photographing device.

In one example embodiment, the third determining unit 411 may determine the first orientation by using a sensor of the photographing device or a sensor disposed on the photographing device. Such sensor is, for example, a gravity sensor.

The fourth determining unit 412 is configured to determine the scenario mode.

In one example embodiment, the scenario mode may be determined according to a user input. The user input may be an input in a form of an audio, a touch, a gesture, or the like. Accordingly, the apparatus of the embodiment of this application may further comprise an input interface for an audio signal, a touch signal, a gesture signal, or the like.

Figure 8:
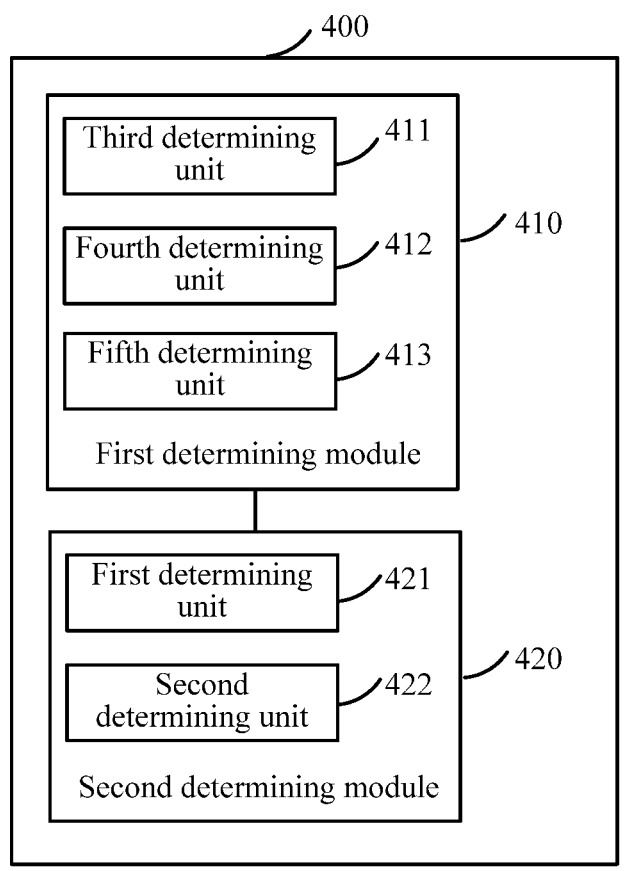
FIG. 8 is an example structural block diagram of a fourth possible implementation of a photographing control apparatus according to an example embodiment of this application.

It should be noted that, in the example embodiment where the benchmark orientation is an orientation of the head of a user, as shown in FIG. 8, the first determining module 410 further comprises:

a fifth determining unit 413 is configured to determine a benchmark orientation by detecting a posture of the head of a user. Detection of a posture of the head of the user by the fifth determining unit 413 may be implemented by acquiring an image of the head of the user. Therefore, the fifth determining unit 413 may comprise a camera independent from the photographing device, or the fifth determining unit 413 is a camera of the photographing device.

Figure 9:
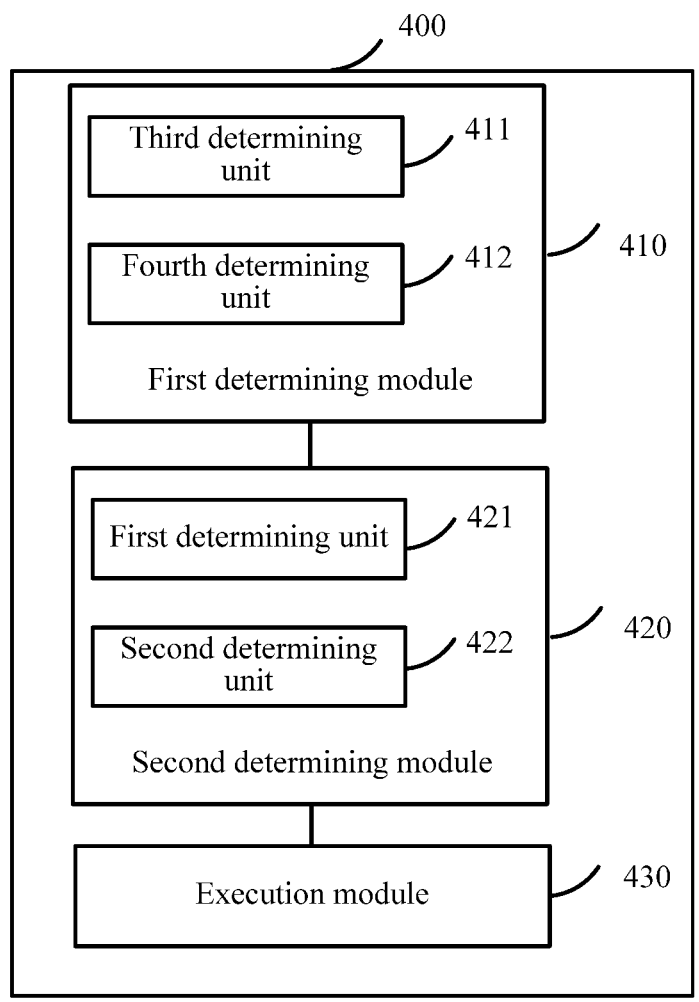
FIG. 9 is an example structural block diagram of a fifth possible implementation of a photographing control apparatus according to an example embodiment of this application.

As shown in FIG. 9, the apparatus of the embodiment of this application further comprises:

an execution module 430, configured to execute photographing according to an imaging mode after the imaging mode is determined.

Specifically, in the example embodiment that the first determining unit 421 determines an imaging area that is on the photosensitive element of the photographing device and is corresponding to the second orientation, the execution module 430 may adjust an optical system of the photographing device according to the imaging area, to cause only the determined imaging area to be capable of receiving light rays. In the example embodiment in which the first determining unit 421 determines an imaging mode by determining the third orientation that is of the imaging module of the photographing device and is corresponding to the second orientation, the execution module 430 may directly or indirectly adjust the orientation of the imaging module according to the third orientation. The "directly" refers to the case where the imaging module itself is adjustable. The "indirectly" refers to the case where the adjustment of the imaging module is implemented by adjusting a specific rotating mechanism. The imaging module is mounted on the photographing device by means of the rotating mechanism.

To sum up, the apparatus of the embodiment of this application is capable of giving consideration to stability of gripping a photographing device, operational convenience, and a photographing effect at the same time.

It can be understood by a person skilled in the art that in the foregoing method of the example embodiment of this application, the value of the serial number of each step does not mean an execution sequence, and the execution sequence of each step should be determined according to the function and internal logic thereof, and should not be any limitation on the example embodiment of this application.

Figure 10:
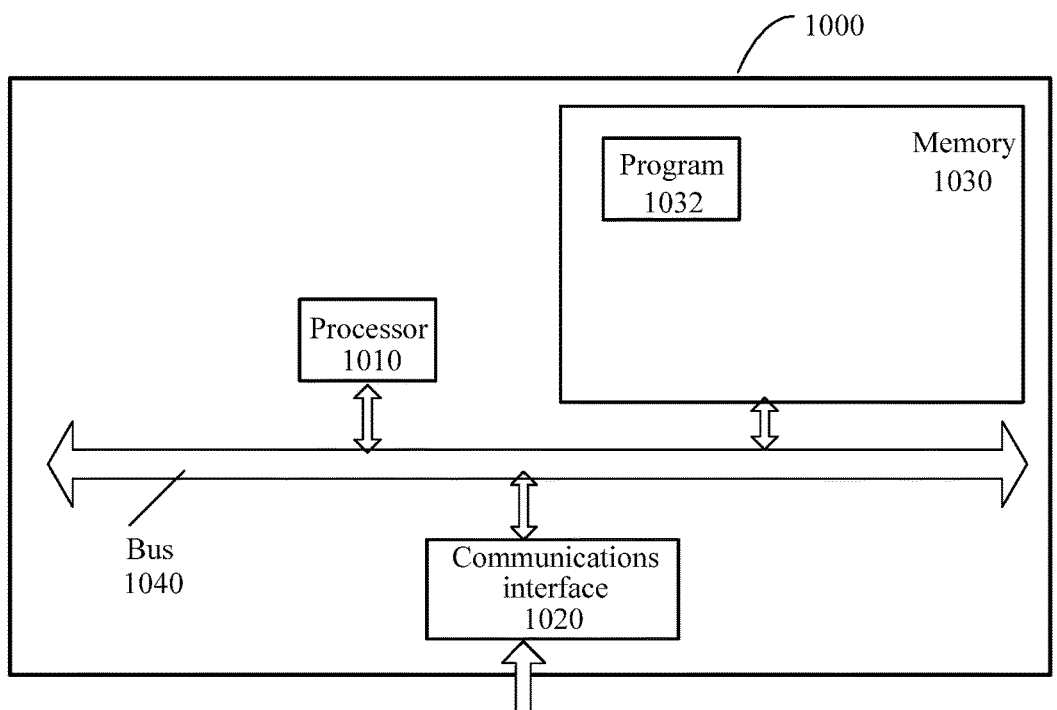
FIG. 10 is an example structural block diagram of a photographing control apparatus according to another example embodiment of this application.

FIG. 10 is a schematic structural diagram of a photographing control apparatus 1000 provided in an embodiment of this application. The specific embodiment of this application does not limit implementation of the photographing control apparatus 1000. As shown in FIG. 10, the photographing control apparatus 1000 may comprise:

a processor 1010, a communications interface 1020, a memory 1030, and a communications bus 1040.

The processor 1010, the communications interface 1020, and the memory 1030 communicate with each other by using the communications bus 1040.

The communications interface 1020 is configured to communicate with a network element such as a client.

The processor 1010 is configured to execute a program 1032, and specifically can implement relevant functions of the forgoing photographing control apparatus in the apparatus embodiments shown in FIG. 4 to FIG. 9.

Specifically, the program 1032 may comprise program code, where the program code comprises a computer operation instruction.

The processor 1010 may be a central processing unit (CPU), an application specific integrated circuit (ASIC), or one or more integrated circuits configured to implement the embodiments of this application.

The memory 1030 is configured to store the program 1032. The memory 1030 may comprise a high speed RAM memory, and may also comprise a non-volatile memory such as at least one magnetic disk memory. The program 1032 may specifically be configured to cause the control apparatus 1000 to execute the following steps:

determining a first orientation of a photographing device and a second orientation corresponding to a scenario mode; and determining, in response to that the first orientation is different from the second orientation, an imaging mode of the photographing device according to the second orientation.

For the example embodiment of the steps in the program 1032, reference may be made to the corresponding descriptions of corresponding steps and units in the foregoing embodiments, which are not described herein again. It may be clearly understood by a person skilled in the art that, for the purpose of convenient and brief description, reference may be made to the description of corresponding processes in the foregoing method embodiments for detailed working processes of the foregoing devices and modules, and details are not described herein again.

Figure 11:
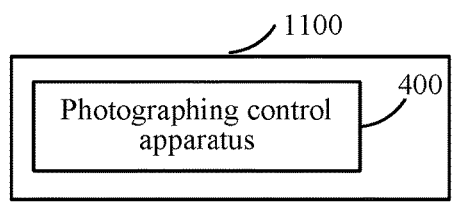
FIG. 11 is an example structural block diagram of a photographing device according to an example embodiment of this application.

As shown in FIG. 11, this application further provides a photographing device 1100. The photographing device 1100 comprises the photographing control apparatus 400 of the embodiments shown in FIG. 4 to FIG. 10. The photographing device 1100 may be any device having photographing and displaying functions, for example, a mobile phone, a tablet computer, or a digital camera.

It may be clearly understood by a person skilled in the art that, for the purpose of convenient and brief description, reference may be made to the description of corresponding processes in the foregoing apparatus embodiments for detailed working processes of the foregoing devices and modules, and details are not described herein again.

Although the invention is described herein in the general context of program modules that execute in conjunction with an application program that runs on an operating system on a computer system, a person skilled in the art will recognize that the invention may also be implemented in combination with other types of program modules. Generally, program modules comprise routines, programs, components, data structures and other types of structures that perform particular tasks or implement particular abstract data types. It can be understood by a person skilled in the art that the invention described herein may be practiced with other computer system configurations, comprising handheld devices, multiprocessor systems, microprocessor-based or programmable consumer electronics, minicomputers, mainframe computers, and so on, and may also be practiced in distributed computing environments where tasks are performed by remote processing devices linked through a communications network. In a distributed computing environment, program modules may be located in both local and remote memory storage devices.

A person of ordinary skill in the art may be aware that, in combination with the examples described in the embodiments disclosed in this specification, units and method steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the example embodiment goes beyond the scope of this application.

When the functions are implemented in a form of a software functional unit and sold or used as an independent product, the functions may be stored in a computer-readable storage medium. Based on such an understanding, the technical solutions of this application essentially, or the part contributing to the prior art, or part of the technical solutions may be implemented in the form of a software product. The computer software product is stored in a storage medium and comprises several instructions for instructing a computer device (which may be a personal computer, a server, or a network device) to perform all or a part of the steps of the methods described in the embodiments of this application. The foregoing computer-readable storage medium comprises physical volatile and non-volatile, removable and non-removable mediums that are implemented in any method or technology for storage of information such as computer-readable instructions, data structures, program modules or other data. The computer-readable storage medium specifically comprises, but is not limited to, a USB flash drive, a removable hard disk, a read-only memory (ROM), a random access memory (RAM), an erasable programmable read-only memory (EPROM), an electrically erasable programmable read-only memory (EEPROM), a flash memory or other solid-state memory technology, a CD-ROM, a digital versatile disc (DVD), an HD-DVD, a Blue-ray disc or other optical storage devices, a magnetic tape, magnetic disk storage or other magnetic storage devices, or any other medium that can be used for storing required information and can be accessed by a computer.

The foregoing example embodiments are merely intended for describing this application rather than limiting this application. A person of ordinary skill in the art should understand that modifications and variations may still be made without departing from the spirit and scope of this application. Therefore, all equivalent technical solutions shall fall within the scope of this application, and the patent protection scope of this application shall be subject to the claims.

What is claimed is:

1. A method, comprising:
   determining, by a system comprising a processor, a first orientation of a photographing device and a second orientation corresponding to a scenario mode; and
   determining, in response to determining that the first orientation is different from the second orientation, an imaging mode of the photographing device according to the second orientation, wherein the determining the imaging mode of the photographing device according to the second orientation comprises:
     determining an imaging area corresponding to the second orientation on a photosensitive element of the photographing device, and
     determining a third orientation corresponding to the second orientation of an imaging module of the photographing device, comprising:
       separating orientating of the photographing device from imaging of the imaging module, and
       adjusting the third orientation of the imaging module to be the same as the second orientation.

2. The method of claim 1, wherein the first orientation and the second orientation use a benchmark orientation as a reference and the benchmark orientation is an orientation of displayed content on the photographing device.

3. The method of claim 1, wherein the first orientation and the second orientation use a benchmark orientation as a reference and the benchmark orientation is an orientation of a head of a user.

4. The method of claim 3, further comprising:
   determining the orientation of the head of the user.

5. The method of claim 1, wherein the first orientation being different from the second orientation comprises the first orientation being rotated by 90° or about 90° relative to the second orientation.

6. The method of claim 1, wherein the determining the first orientation of the photographing device and the second orientation corresponding to the scenario mode comprises:
determining the scenario mode, wherein
the scenario mode comprises: at least one of a landscape mode or a portrait mode,
the second orientation corresponding to the landscape mode is an orientation that causes a length of a photographed image in a horizontal direction to be greater than the length of the photographed image in a vertical direction by using the benchmark orientation as a reference; and
the second orientation corresponding to the portrait mode is another orientation that causes the length of the photographed image in the horizontal direction to be less than the length of the photographed image in the vertical direction by using the benchmark orientation as the reference.

7. The method of claim 6, wherein in the determining the scenario mode comprises:
determining the scenario mode according to a user input.

8. The method of claim 1, further comprising:
photographing according to the imaging mode.

9. The method of claim 8, wherein the photographing according to the imaging mode comprises:
adjusting an optical system of the photographing device according to the imaging area.

10. The method of claim 1, further comprising:
photographing according to the imaging mode.

11. The method of claim 10, wherein the photographing according to the imaging mode comprises:
adjusting the imaging module according to the third orientation.

12. An apparatus, comprising:
a memory that stores executable modules; and
a processor, coupled to the memory, that executes or facilitates execution of the executable modules, comprising:
a first determining module configured to determine a first orientation of a photographing device and a second orientation corresponding to a scenario mode; and
a second determining module configured to determine, in response to a determination that the first orientation is different from the second orientation, an imaging mode of the photographing device according to the second orientation,
wherein the second determining module comprises:
a first determining unit configured to determine an imaging area corresponding to the second orientation on a photosensitive element of the photographing device; and
a second determining unit configured to:
determine a third orientation corresponding to the second orientation of an imaging module of the photographing device,
separate orientating of the photographing device from imaging of the imaging module, and
adjust the third orientation of the imaging module to be the same as the second orientation.

13. The apparatus of claim 12, wherein the first determining module comprises:

a third determining unit configured to determine the first orientation of the photographing device.

14. The apparatus of claim 13, wherein the first determining module further comprises:
a fourth determining unit configured to determine the scenario mode, wherein
the scenario mode comprises: a landscape mode or a portrait mode;
the second orientation corresponding to the landscape mode is an orientation that causes a length of a photographed image in a horizontal direction to be greater than the length of the photographed image in a vertical direction by using a benchmark orientation as a reference; and
the second orientation corresponding to the portrait mode is another orientation that causes the length of the photographed image in a horizontal direction to be less than the length of the photographed image in the vertical direction by using the benchmark orientation as the reference.

15. The apparatus of claim 14, wherein the fourth determining unit determines the scenario mode according to a user input.

16. The apparatus of claim 14, wherein the first orientation and the second orientation use the benchmark orientation as the reference and the benchmark orientation is an orientation of a head of a user; and
the first determining module further comprises:
a fifth determining unit configured to determine the orientation of the head of the user.

17. The apparatus of claim 12, wherein the executable modules further comprise:
an execution module configured to execute photographing according to the imaging mode.

18. The apparatus of claim 17, wherein the execution module is further configured to adjust an optical system of the photographing device according to the imaging area.

19. The apparatus of claim 12, wherein the executable modules further comprise:
an execution module configured to execute photographing according to the imaging mode.

20. The apparatus of claim 19, wherein the execution module is further configured to adjust the imaging module according to the third orientation.

21. A photographing device, comprising the apparatus of claim 12.

22. A computer readable storage device, comprising at least one executable instruction, which, in response to execution, causes a system comprising a processor to perform operations, comprising:
determining a first orientation of a photographing device and a second orientation corresponding to a scenario mode; and
determining, in response to determining that the first orientation is different from the second orientation, an imaging mode of the photographing device according to the second orientation,
wherein the determining an imaging mode of the photographing device according to the second orientation comprises:
determining an imaging area corresponding to the second orientation on a photosensitive element of the photographing device, and
determining a third orientation corresponding to the second orientation of an imaging module of the photographing device, comprising:

separating orientating of the photographing device from imaging of the imaging module, and adjusting the third orientation of the imaging module to be the same as the second orientation.

23. A device, comprising a processor and a memory, wherein the memory stores executable instructions, the processor being connected with the memory via a communication bus, and when the device is operating, the processor executes or facilitates execution of the executable instructions stored by the memory to cause the device to perform operations, comprising:

determining a first orientation of a photographing device and a second orientation corresponding to a scenario mode of the photographing device; and in response to determining that the first orientation is different from the second orientation, determining an imaging mode of the photographing device according to the second orientation, wherein the determining an imaging mode of the photographing device according to the second orientation comprises:

determining an imaging area corresponding to the second orientation on a photosensitive element of the photographing device, and determining a third orientation corresponding to the second orientation of an imaging module of the photographing device, comprising:

separating orientating of the photographing device from imaging of the imaging module, and adjusting the third orientation of the imaging module to be the same as the second orientation.

24. The device of claim 23, wherein the first orientation and the second orientation use a benchmark orientation as a reference and the benchmark orientation is an orientation of displayed content on the photographing device.

25. The device of claim 23, wherein the first orientation and the second orientation use a benchmark orientation as a reference and the benchmark orientation is an orientation of a head of a user.

26. The device of claim 25, further comprising:

determining the orientation of the head of the user.

27. The device of claim 23, wherein the first orientation being different from the second orientation comprises the first orientation being rotated by 90° or about 90° relative to the second orientation.

* * * * *